(12) United States Patent　　(10) Patent No.: US 7,114,890 B2
Noggle　　(45) Date of Patent: Oct. 3, 2006

(54) CUTTING TOOL ADJUSTMENT DEVICE

(75) Inventor: Kenneth G. Noggle, West Bloomfield, MI (US)

(73) Assignee: Valenite Inc., Madison Heights, MI (US)

( * ) Notice: Subject to any disclaimer, the term of this patent is extended or adjusted under 35 U.S.C. 154(b) by 782 days.

(21) Appl. No.: 09/782,915

(22) Filed: Feb. 13, 2001

(65) Prior Publication Data

US 2002/0110428 A1　Aug. 15, 2002

(51) Int. Cl.
*B23B 51/00* (2006.01)
(52) U.S. Cl. .......................... 407/36; 407/38; 407/39; 407/44; 408/153; 408/713
(58) Field of Classification Search .................. 407/30, 407/33, 36, 37, 38, 40, 41, 44, 45, 47, 49; 72/482.3, 482.4; 83/698.51, 698.61, 699.31, 83/699.41, 699.51, 699.61; 411/57.1, 58, 411/60.2, 60.1; 408/153, 161, 190, 191, 408/713
See application file for complete search history.

(56) References Cited

U.S. PATENT DOCUMENTS

| | | | |
|---|---|---|---|
| 1,736,273 A | | 11/1929 | Miller |
| 2,100,873 A | * | 11/1937 | Roberts ........................ 411/58 |
| 2,584,449 A | | 2/1952 | Hoglund |
| 2,751,006 A | * | 6/1956 | Lane ........................... 407/85 |
| 3,195,376 A | | 7/1965 | Bader |
| 3,205,559 A | | 9/1965 | Greenleaf |
| 3,216,305 A | * | 11/1965 | Kaplan et al. ................. 411/58 |
| 3,497,934 A | | 3/1970 | Hudson |
| 3,675,290 A | | 7/1972 | Mayer |
| 3,703,117 A | * | 11/1972 | Matthews .................... 83/677 |
| 3,708,843 A | | 1/1973 | Erkfritz |
| 3,711,216 A | | 1/1973 | Zurcher |
| 3,785,746 A | | 1/1974 | Wolf et al. |
| 3,792,517 A | | 2/1974 | Gage |
| 4,470,731 A | | 9/1984 | Erkfritz |
| 4,631,994 A | | 12/1986 | Jester et al. |
| 4,645,383 A | | 2/1987 | Lindsay |
| 4,692,069 A | * | 9/1987 | Kieninger ..................... 407/39 |
| 4,805,260 A | * | 2/1989 | Tooth ........................... 411/58 |
| 4,938,638 A | | 7/1990 | Hessman et al. |
| 4,954,024 A | * | 9/1990 | Kress et al. ................. 407/108 |
| RE34,054 E | | 9/1992 | Millington et al. |
| 5,154,558 A | * | 10/1992 | McCallion .................... 411/54 |
| 5,209,610 A | * | 5/1993 | Arai et al. ..................... 407/36 |
| 5,391,023 A | | 2/1995 | Basteck |
| 5,536,119 A | | 7/1996 | Werner et al. |
| 6,056,484 A | * | 5/2000 | Mitchell et al. ............... 407/36 |
| 6,109,838 A | | 8/2000 | Riviére |
| 6,126,364 A | | 10/2000 | Riviére |

(Continued)

FOREIGN PATENT DOCUMENTS

CA　　　　643285　　　6/1962

(Continued)

*Primary Examiner*—Erica Cadugan
*Assistant Examiner*—Dana Ross
(74) *Attorney, Agent, or Firm*—Drinker Biddle & Reath LLP (57) ABSTRACT

The instant invention is directed to an adjustment device for a multiple insert cutting tool with adjusting elements using a wedge to adjust the position of an insert in a tool body pocket through an intermediate component having expansion elements. The intermediate component is disposed in a cavity which is at least partly contiguous with a pocket containing an insert. The intermediate component engages the insert to be adjusted and, when expanded, adjusts the position of the insert.

20 Claims, 5 Drawing Sheets

U.S. PATENT DOCUMENTS 6,155,753 A    12/2000  Chang
6,254,319 B1 *  7/2001  Maier et al. .................. 407/45

FOREIGN PATENT DOCUMENTS

| | | |
|---|---|---|
| CH | 666-643 | 8/1988 |
| DE | 386659 | 12/1921 |
| GB | 594473 | 11/1947 |
| SU | 958049 | 9/1982 |
| WO | WO98/43766 | 10/1998 |

* cited by examiner

CUTTING TOOL ADJUSTMENT DEVICE

FIELD OF THE INVENTION

The present invention relates to adjusting devices for cutting tools. More particularly, it is directed to a device for adjusting the position of a cutting edge of an insert secured to the body of a multiple insert tool such as, by way of non-limiting example, a rotary cutter, broaching, boring or reaming tool.

BACKGROUND OF THE INVENTION

To facilitate an understanding of the invention, a brief description of a typical use environment for an adjustment device in a rotary tool follows: Rotary cutting tools have a generally cylindrical tool body. One or more cutting inserts are generally secured around the periphery of the tool body in recesses known as pockets that provide a seating surface or surfaces that support the insert. Each insert is secured into its respective pocket by retaining devices, such as wedges, clamps, screws or combinations of these devices. While pockets and retaining devices secure the inserts during use, they do not provide means for making fine adjustments in the position of the cutting edges of the inserts with respect to each other or the tool body.

Fine adjustment of cutting edge position is desirable since even minor misalignment, of as little as about 0.001 inches, between the edges of the several cutting inserts can result in surface imperfections on the surface generated during machining. Variables in the size and shape of pockets in the tool body may cause such misalignment. Additionally, the size and shape of the inserts can vary 0.001 inches or more due to manufacturing tolerances or uneven wear during use. Thus, there is a demand in the industry for cutting tools that provide for small adjustments in the position of inserts in the tool body to improve alignment of the inserts' cutting edges relative to the tool body and the other cutting edges.

In the prior art there are known cutting tools, for instance adjustable reamers, that use screws with tapered heads for adjusting cutting elements through secondary components such as split wedges, see U.S. Pat. No. 5,391,023 to Basteck. The Basteck patent teaches "wedge means" consisting of the combination of a cylindrical stop pin and taper-headed screw. The stop pin is force fitted into the tool body and the screw engages an internal thread of the pin to draw the tapered head into the conical internal passage of the stop pin. Because the screw engages the pin, and not the tool body, the pin must be retained in the tool body by a force fit or other means independent of the screw. One drawback of this device is that as the screw is advanced in the pin, rotational and linear forces are exerted on the stop pin which over time can degrade the force fit. As the screw is advanced, the stop pin is split along the slot, each side of the stop pin moving away from its longitudinal axis. The greatest increase in diameter of the stop pin is at the top of the pin, where the screw head taper is widest, and progressively decreasing along the length of the stop pin to the end of the slot, where expansion is essentially prevented by the solid nature of the stop pin. The asymmetrical expansion of the stop pin (greater at the top than at the bottom) creates an arcing moment that is delivered to the cutting element adjacent the stop pin. A drawback of this device is that this arcing moment can cause the insert to tend to rotate in the pocket.

In another common design, one wall of the insert-receiving pocket in the tool body is replaced with a wedge-shaped member that slides along the insert flank when actuated by adjustment screws. Loosening or tightening adjustment screws produces movement of the wedge-shaped member which movement is translated into movement of the insert with respect to the tool body. Applicants have observed a number of drawbacks associated with such devices. For example, the contact between the wedge-shaped member and the tool body often results in a friction producing irregular sliding of the wedge-shaped member.

Another known design to adjust the position of an insert mounted onto a tool body provides a cantilevered wall integrally connected to the tool body, that forms a portion of the pocket that supports a side of the insert and a wedge mechanism for elastically flexing the wall to adjust the position of the insert, see U.S. Pat. No. 6,056,484. One drawback of this design is that it requires the manufacture of precision elements integral with the tool body, which is expensive and time consuming. Furthermore, the integral nature of the wall requires lengthy downtime in the event of failure or damage to the adjustment device due to the necessity to rework the tool body in the event of failure of a single cantilevered wall.

Thus, there is a need for a device for making fine adjustments to the position of cutting inserts mounted on a multiple insert tool that provides better accuracy and reliability of cutting edge position adjustment than prior art adjusting devices. There is seen a further need that such an adjustment device has parts which are quickly and easily replaced in the event of wear or failure and would require less precision tooling of the tool body to reduce the cost of the resulting adjustable multiple insert tool. It is, of course, desirable that the adjustment device is readily retrofit into conventional tools with a minimum of retooling.

SUMMARY OF THE INVENTION

It is an object of the invention to provide a device for making fine adjustments to the position of cutting inserts mounted on a multiple insert tool that overcomes the drawbacks of prior art adjusting devices, has parts which are quickly and easily replaced in the event of wear or failure. It is a further object of the invention to provide such a device for use in cutting tools, such as a rotary cutter, non-rotary cutter, boring, reaming, broaching, slotting tool or the like.

It is an object of the invention to provide a device for adjusting the position of a cutting insert adjustably secured in a pocket disposed in a cutting tool body, comprising a cavity in the cutting tool body, at least a portion of the cavity being contiguous with the pocket; an intermediate component disposed within the cavity and comprising an external peripheral surface and expansion elements disposed around the peripheral surface, the intermediate component engaging the insert at the contiguous portion, and a wedging device movably attached to the cutting tool body and engaging the intermediate component such that actuation of the wedging device results in expansion of the intermediate component along substantially the entire length of the component, whereby the position of the insert is adjusted.

It is a further object of the invention to provide an expansion mechanism comprising slots and a tapered portion disposed on a first region of an internal peripheral surface of the intermediate component.

It is a further object of the invention to provide a wedge device comprising a conical wedge. It is a further object of the invention to provide a wedge device including an adjustment screw threadingly engaged to the tool body.

It is a further object of the invention to provide an intermediate component that defines a portion of a pocket side of the pocket.

It is a further object of the invention to provide an intermediate component further comprising a plurality of end faces, each end face being intersected by at least one of the expansion elements.

It is a further object of the invention to provide an adjustment device wherein actuation of the wedging device causes expansion of the intermediate component along substantially the entire length of the component.

It is a further object of the invention to provide an conical wedge tapered at an angle of between about 30° to 5°. It is a further object of the invention to provide an intermediate component having an internal peripheral surface with a tapered portion for engaging a side of the conical wedge.

It is a further object of the invention to provide a device for adjusting the position of an insert relative to a cutting tool body, comprising a retaining device including a pocket in the tool body having a pocket floor and pocket sides for adjustably securing the insert; a sleeve disposed in a cavity in the tool body, the cavity being at least partially contiguous with the pocket, the sleeve engaging a flank of the insert; an adjustment screw engaging the sleeve such that actuation of the screw causes expansion of the sleeve along substantially the entire length of the sleeve exerting translational force on the insert flank thereby adjusting a position of the insert in relation to the tool body.

It is a further object of the invention to provide an adjustment screw comprising a wedge in engagement with the sleeve and a yet further object to provide a wedge that is conical. It is a yet further object of the invention to provide a conical wedge is tapered at an angle of between about 30° to 5°.

It is a further object of the invention to provide a sleeve that includes a tapered portion for engaging a side of the conical wedge.

It is a further object of the invention to provide a sleeve having slots and a tapered portion disposed on a first region of an internal peripheral surface of the sleeve. It is a yet further object of the invention to provide an sleeve having a plurality of end faces, each end face being intersected by at least one of the slots.

It is a further object of the invention to provide a retaining device including a clamping screw threadingly engaged to the tool body for securing the insert to the tool body.

In is an object of the invention to provide an adjustable tool assembly comprising a tool body having a removably attached cartridge and an insert adjustably secured in a pocket in the cartridge, the tool assembly further comprising an adjustment device for transmitting axially outward-directed force to the insert, whereby the adjustment device allows fine adjustment of positioning of the insert on the tool body; the adjustment device comprising a cavity in the cartridge, at least a portion of the cavity being contiguous with the pocket; an intermediate component disposed within the cavity and comprising an external peripheral surface and at least one expansion mechanism, the external peripheral surface engaging the insert at the contiguous portion; and a wedging device movably attached to the cartridge and engaging the intermediate component such that actuation of the wedging device results in expansion of the intermediate component in a direction substantially parallel to a desired direction of adjustment of the insert.

It is also an object of the invention to provide a method for adjusting the position of an insert relative to a cutting tool body, wherein the tool body has a retaining device including a pocket having a floor and sides for adjustably securing the insert to the tool body, comprising the steps of positioning an insert in a pocket in engagement with an intermediate component secured in a cavity contiguous with the pocket, the intermediate component comprising an external peripheral surface and at least one expansion mechanism, the external peripheral surface engaging the insert at the contiguous portion; tightening the retaining device to adjustably secure the insert in the pocket; and actuating a wedging device, the wedging device being in engagement with the expansion mechanism, thereby causing expansion of the intermediate component resulting in change of position of the insert.

BRIEF DESCRIPTION OF THE DRAWINGS

FIG. 3 is a perspective view of an adjustment screw according to an embodiment of the invention.

FIG. 4a is a top view of a sleeve according to the embodiment of FIG. 1.

FIG. 4b is a perspective view of the sleeve of FIG. 4a.

FIG. 8b is a perspective view of the sleeve of FIG. 8a.

FIG. 9a is a top view of a sleeve according to a third embodiment of the invention.

FIG. 9b is a perspective view of the sleeve of FIG. 9a.

DESCRIPTION OF THE PREFERRED EMBODIMENTS

The instant invention is directed to an adjustment device for a multiple insert cutting tool with adjusting elements using a wedge to adjust the position of an insert in a tool body pocket through an intermediate component. The intermediate component is disposed in a cavity which is at least partly contiguous with a pocket containing an insert. The intermediate component is positioned in the cavity so that an abutment flank of the component abuts the cavity wall while the component's opposite flank, the flexing flank, engages the insert to be adjusted.

The pocket may have a pocket side engaging a portion of the insert flank that is to be contacted by the intermediate component, in which case the pocket side is provided with an aperture wherein the intermediate component expands into the aperture and exerts force on the insert. In this embodiment the intermediate component is preferably substantially the same dimension as the aperture.

Alternatively, the entire pocket side adjacent the insert flank that is to be contacted by the intermediate component may be omitted and the intermediate component sized to fit the opening in the pocket left by omission of the pocket side.

Generally, in such an embodiment the intermediate component flank extend over the entire area of the insert flank in contact with the component.

In another embodiment, the flexing flank is separated from a clearance surface of the cavity by a clearance space which allows limited expansion of the intermediate component within the cavity. The clearance surface functions as a stop to prevent overexpansion of the intermediate component, for example expansion beyond the elastic limits of the component. In an alternative embodiment, the entire flexing flank is in contact with the insert and the cavity does not provide a clearance surface.

In one aspect, the invention provides expansion and contraction of the intermediate component, when actuated by the wedge, along substantially the entire length of the intermediate component, in contrast to the prior art which teaches asymmetrical expansion. In another aspect of the invention, the intermediate component expands and contracts in a direction that is substantially parallel to the desired direction of adjustment of the cutting element. Thus, the vector components of the force exerted by expansion of the intermediate component are substantially along only one axis, the axis along which the insert is desired to move. This improvement results in the cutting insert being subjected to linear rather than arcuate force; thus, the insert moves in a straight direction without the tendency to rotate.

It is desirable that the interface between the tool body, intermediate component and insert is rigid. That is, substantially no change in position of the intermediate component is observed during machining or when the insert is removed from the pocket. In this manner, a new insert can be positioned in the pocket and the insert position need only be adjusted for variances between the inserts rather than adjustment for insert and pocket variances.

The intermediate component is retained in the cavity by an adjustment screw threadingly engaging the tool body. However the intermediate component may be retained in the cavity by any conventional means which does not interfere with the functioning of the invention, in particular linear expansion of the intermediate component.

It is desirable that the material of the intermediate component has sufficient elastic properties to allow for desired expansion, without permanent deformation, and is generally comprised of materials known in the industry as useful for springs, but may be a composite of metal and a resilient plastic or rubber.

The intermediate component may have an external periphery of any crossectional shape which does not interfere with the invention's operation. It is desirable that the intermediate component shape prevents rotation of the intermediate component during use, for example, round with flat areas, oval or polygonal.

The intermediate component has at least one expansion mechanism, including by way of non-limiting example, an tapered portion and a plurality of slots extending substantially parallel to the longitudinal axis of the intermediate component, which allow the intermediate component to expand when actuated by a wedging device.

Each slot intersects one of the end faces of the intermediate component. It is desirable that the slots are disposed around the periphery of the intermediate component in alternating fashion, i.e. slots intersect one end face adjacent slots intersecting the opposite end face.

Optionally, one or more slots may extend at an angle to the longitudinal axis of the intermediate component, this feature is desirable when seeking to provide a greater number or length of slots. The slots may extend along the length of the intermediate component at an angle of 0–45 degrees, provided such angulation does not interfere with the functioning of the invention. It is desirable to have an equal number of slots intersecting each end face of the intermediate component for even expansion and manufacturing ease.

The slots may be distributed around the periphery of the intermediate component in any manner which does not interfere with the functioning of the invention. It is desirable that the slots are disposed on portions of the intermediate component which do not abut the insert.

Another benefit of the instant invention is that it does not induce loads on the adjustment screw in a direction perpendicular to its axis. Such loads tend to deform the screw and cause binding between the screw and the tapered portion of the intermediate component.

The intermediate component is held in the body by the adjustment screw extending through the component and into the tool body. The intermediate component has features to prevent rotation of the component in relation to the tool body during adjustment. The intermediate component comprises a hollow resiliently expandable body having an external peripheral surface and an internal peripheral surface. The internal peripheral surface has a wedge disposed thereon, along at least a portion of the surface extending in a direction parallel to the longitudinal axis. It is preferred that the wedge is limited to only a portion of the circumference of the internal peripheral surface. Thus, movement of the intermediate component is limited preferably to the side of the component abutting the cutting insert.

Figure 1:
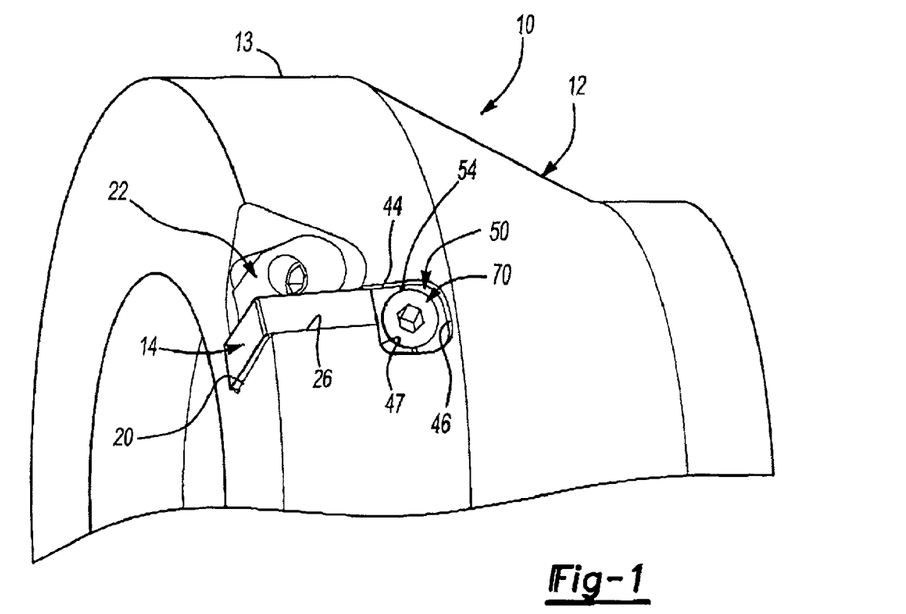
FIG. 1 is a cutaway perspective view of an embodiment of the invention in the use environment of a milling cutter.
Figure 2:
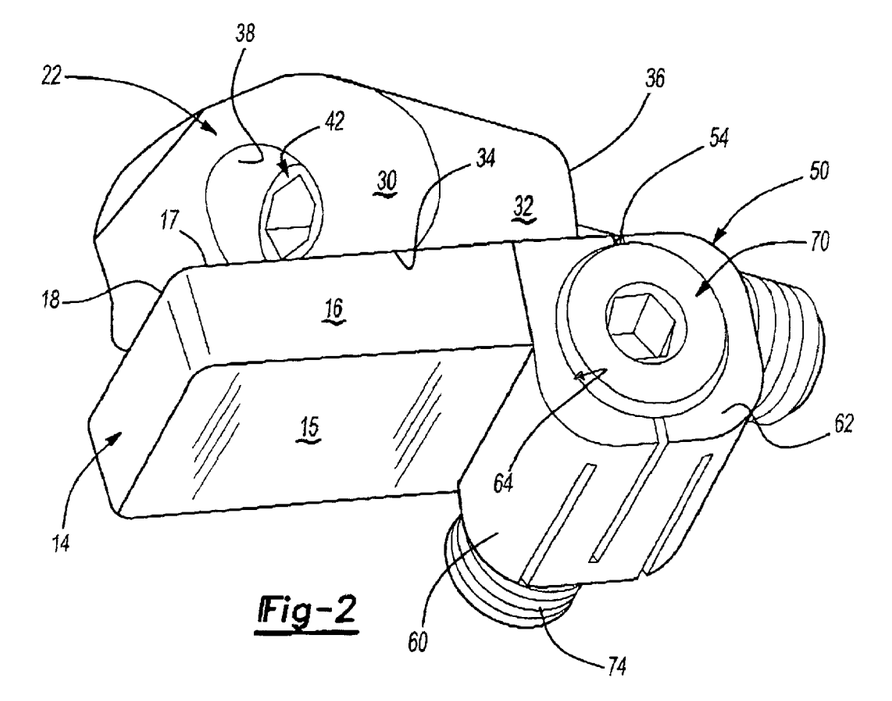
FIG. 2 is a perspective view of the embodiment of FIG. 1, removed from the tool body, showing the invention in its positional relation to a retaining wedge and an insert.

With reference now to FIGS. 1 and 2, wherein like numerals designate like components throughout all of the FIGS., the insert adjusting device of the invention is adapted for use in a milling cutter 10 having a tool body 12. At least one cutting insert 14 with major surfaces 15, flanks 16, and cutting edges 17 and 18 is releasably secured in pocket 20 in tool body 12 by a retaining device. Only a single insert is shown on the tool body in FIG. 1, it being understood in the art that a plurality of such inserts may be uniformly disposed and releasably secured around the outer diameter 13 of the tool body 12 in a similar manner. In the embodiment of FIG. 1, each retaining device [24] comprises a retaining wedge 22 and a pocket 20. Retaining wedge 22 comprises a top surface 30, an outer periphery 32 including an insert-contacting flank 34 and a bottom surface 36. The retaining wedge 22 has a centrally disposed hole 38 which extends from the top surface 30 through the bottom surface 36 for receiving retaining screw 42, which screw engages a threaded bore 40 (not shown) in the tool body 12. While the retaining device disclosed in FIG. 1 utilizes a pocket 20 in combination with a retaining wedge 22 secured to the tool body by a retaining screw 42, the invention is equally applicable to other retaining devices that utilize the combination of an insert receiving seat, for example a pocket, cartridge or the like, and various insert holding devices that secure the insert 14 to the tool body 12 and do not interfere with the functioning of the invention, for example clamps and screws. Thus, the insert 14 is secured to a cutting member which could comprise the tool body or a cartridge mounted in the tool body. The retaining device is designed, in a manner known in the art, to allow for minute changes of position, on the order of 0.0005 to 0.0075 inches as a result of forces exerted by the adjustment device.

Pocket 20 includes a pocket floor 26 for receiving and supporting a cutting insert 14. The pocket 20 is contiguous with a cavity 44 of substantially polygonal external shape in tool body 12. A hollow sleeve 50 of substantially polygonal external shape fits inside cavity 44. The sleeve 50 is in the form of tube having a hollow interior defining a hole 52 extending from one end 62 to the other end 62 of the sleeve, an external peripheral surface 60, end faces 62 and an internal peripheral surface 64.

FIG. 2 is a perspective view of the embodiment of FIG. 1 showing the invention in its positional relation to retaining wedge 22 and insert 14. The sleeve 50 has a plurality of slots 54, extending substantially parallel to the longitudinal axis of the sleeve, which allow the sleeve to expand. Each slot intersects one of the end faces 62 of the sleeve. Expansion of the portion of the sleeve in engagement with the insert transmits force to the substantially incompressible insert, causing the insert to move outward along the pocket floor. In this manner, expansion or contraction of the sleeve adjusts the position of the insert 14 and hence the cutting edge 18 in relation to the tool body 12. It is desirable that the sleeve 50 engages, at least, between 50% to 100% of the insert flank 16, thereby providing for efficient transfer of force from the adjustment device to the insert.

Figures 3, 4A, 4B:
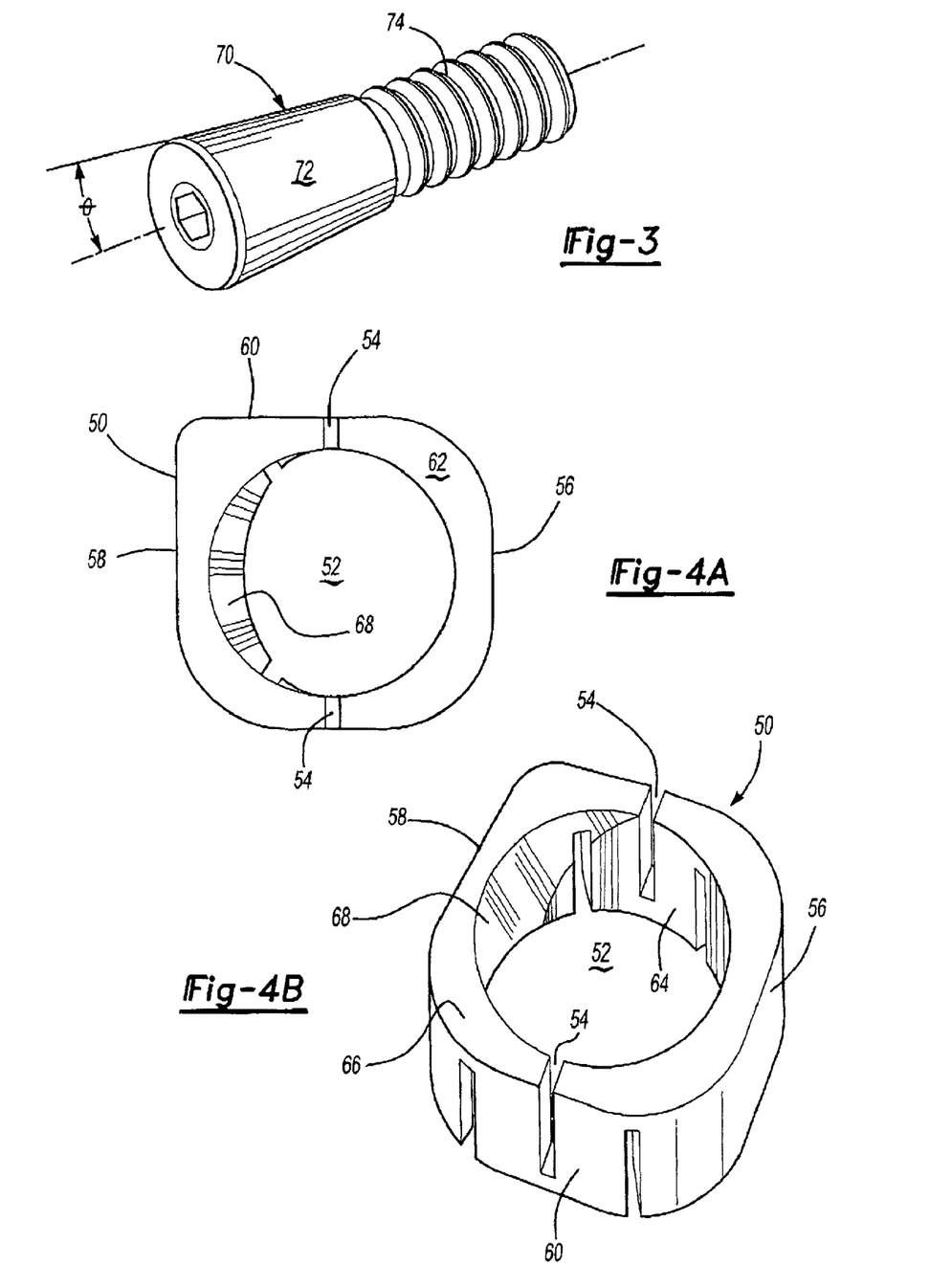

Sleeve 50 is retained in the tool body 12 by an adjustment screw 70 extending through the hole 52 of the sleeve 50 and threadingly engaging tool body 21 As shown in FIGS. 4*a* and 4*b*, sleeve 50 has a tapered portion 68. The sleeve may be expanded by either advancement or retraction of the adjustment screw, depending upon the angle of the tapered portion 68.

Referring now to FIG. 3 which shows a perspective view of an adjustment screw 70 according to one embodiment of the invention. The screw has a conical portion 72 for contacting tapered portion 68 of the sleeve 50, thereby expanding the sleeve as the adjustment screw 70 is threaded into the mill body. In an alternative embodiment, threading the insert into the tool body causes contraction of the sleeve from a previously expanded state. Altering the expansion of the sleeve moves the insert. It is desirable that the conical portion 72 of the adjustment screw is at least 50% of the length of the sleeve, preferably 60% to 100%, most preferably 75% to 95%. The angle "θ" of the conical portion 72, with respect to the axis of rotation of the adjustment screw 70 is between 5° and 30°. The small angle enhances the fine control of the adjustment device in changing the position of the cutting edge 18 of the insert 14. A adjustment screw 70 is provided with fine threads 74 to enhance the fine adjustment of the position of the insert. The number of threads per inch ranges from 20 to 50, it being desirable that the threads per inch be at least 30, preferably approximately 40. The small pitch of the threads not only enhances control, but also helps to insure that the adjustment screw 70 will not loosen due to the mechanical shock and vibration associated with a cutting operation.

FIG. 4*a* and 4*b* show a sleeve 50 of the embodiment of FIG. 1. A plurality of slots 54 are disposed on sleeve 50. The slots are disposed around the periphery of the sleeve in alternating fashion, i.e. slots intersecting one end face are positioned adjacent and offset from slots intersecting the opposite end face. The external peripheral surface 60 is generally polygonal and comprises an abutment flank 56 for contacting abutment surface 46 of the cavity and a flexing flank 58 for engaging the insert. The internal peripheral surface 64 is provided with a first region 66 having a tapered portion 68 extending at least a portion of the length of the sleeve toward one of the end faces 62. The first region 66 extends around flexing flank 58, preferably the portion of thereof engaging the insert 14.

Figure 5A:
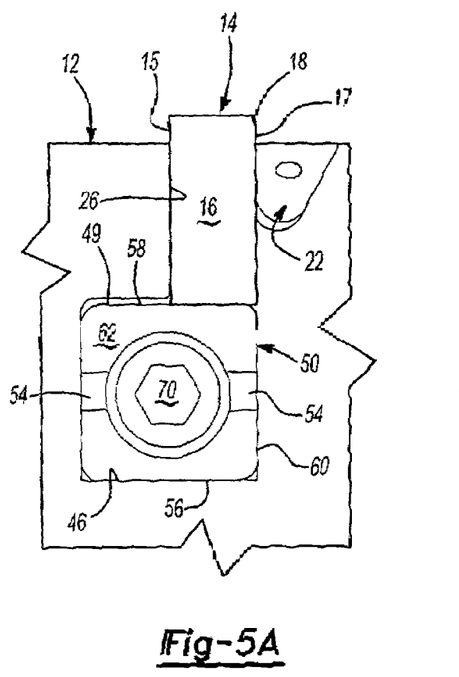
FIG. 5a is a top cutaway view of the embodiment of FIG. 1, after adjustment of the position of the insert.
Figure 5B:
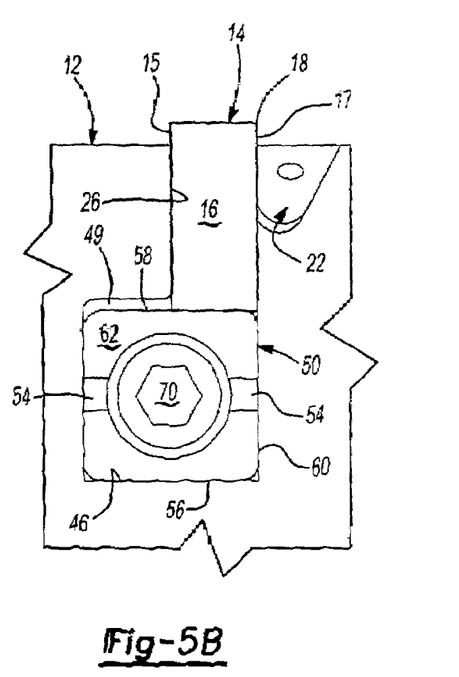
FIG. 5b is a top cutaway view of the embodiment of FIG. 1, prior to adjustment of the position of the insert.

FIG. 5*b* is atop cutaway view of the embodiment of FIG. 1, showing insert 14 adjustably secured in tool body 12, prior to adjustment of the position of the insert 14. Sleeve 50 is positioned in the cavity 44 of tool body 12 by adjusting screw 70 such that abutment flank 56 contacts abutment surface 46 of the cavity 44 and flexing flank 58 engages insert 14. The ordinary expedient for accomplishing same is offsetting the threaded bore into which adjusting screw 70 is threadingly engaged, in a manner known in the art. The interface between the tool body, sleeve and insert is rendered rigid, and shift or "springing back" of the sleeve is minimized or stopped.

In the embodiment of FIG. 1, the flexing flank 58 is separated from clearance surface 47 by clearance space 49, which space allows expansion of the sleeve within the cavity, the sleeve thereby exerting force on the insert.

FIG. 5*a* shows the embodiment of FIG. 5*b*, after adjustment of the position of the insert by actuation of adjustment screw 70. The clearance space 49 is reduced in size due to expansion of sleeve 50, which expansion transmits force to substantially incompressible insert 14, thereby causing movement of the insert along pocket floor in a direction substantially perpendicular to the plane of the insert flank engaging flexing flank 58. In an alternative embodiment, shown in FIG. 10, no clearance space is required as flexing surface 58 of sleeve 50 does not adjoin a clearance surface 47 of cavity 44.

Figures 6, 7:
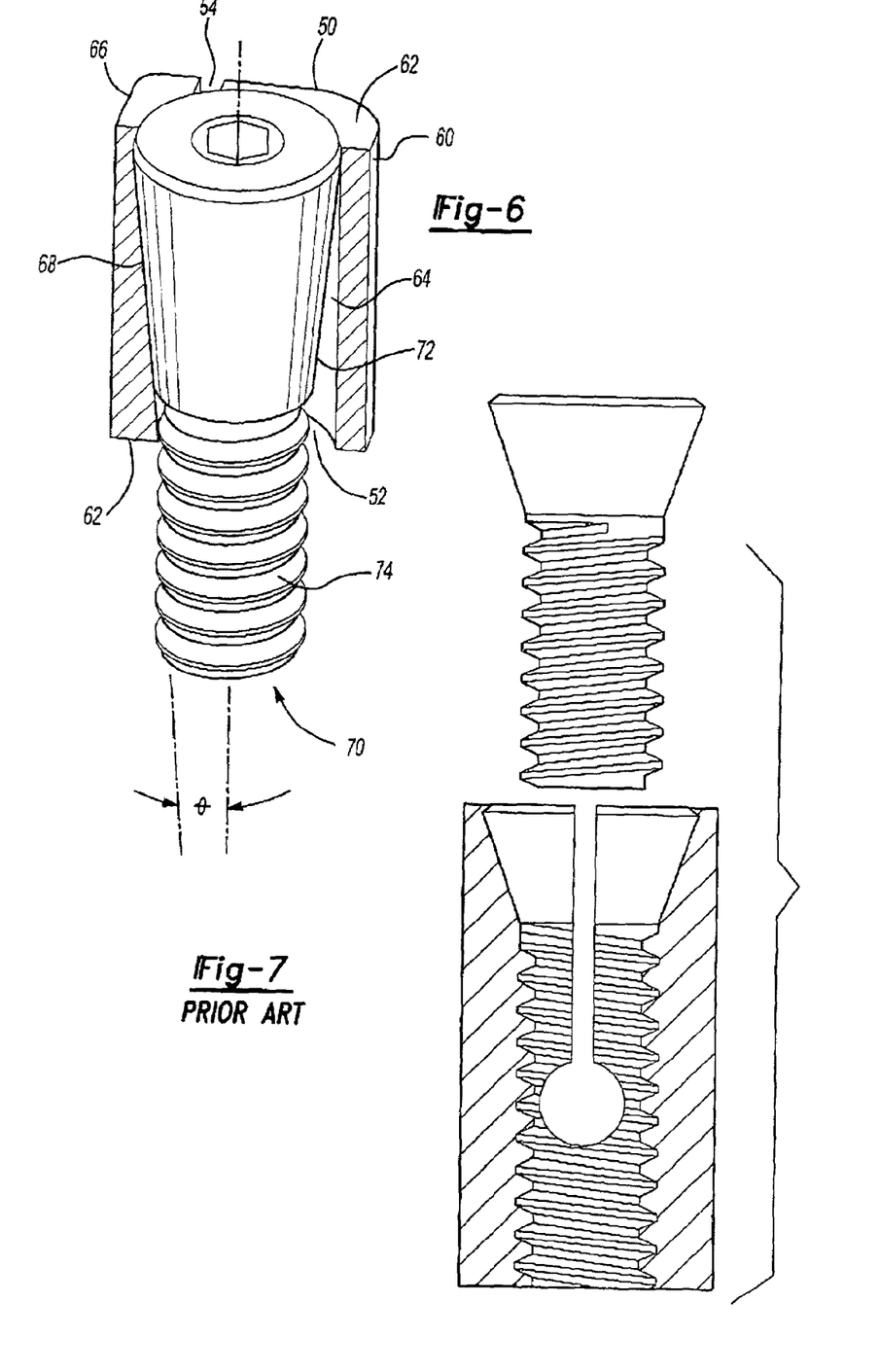
FIG. 6 is partial crossectional view of a sleeve and an adjustment screw of an embodiment of the invention.
FIG. 7 is a partial crossectional view of an adjustment device of the prior art.

FIG. 6 is partial crossectional view of a sleeve 50 and an adjustment screw 70 of an embodiment of the invention showing the relation between the tapered portion 68 of the sleeve 50 and the conical portion 72 of the adjustment screw 70. The tapered portion 68 is disposed along the length of the sleeve 50 at an angle "φ" to the longitudinal axis of the sleeve. When adjustment screw 70 is advanced into the tool body, the conical portion 72 thereof engages tapered portion 68 translating the downward force of the screw to force substantially perpendicular to the flexing flank of sleeve 50 thereby causing expansion of the sleeve.

It is desirable that the angle of the conical portion 72 of the adjustment screw 70 to the longitudinal axis of the sleeve 50 is substantially the same as the angle of the tapered portion 68 of the sleeve 50 to that longitudinal axis. The difference"d" between these angles may range from zero to ten degrees, however the greater the value of "d", the more likely binding will occur in operating the adjustment device.

FIG. 7 is a partial crossectional view of an adjustment device of the prior art which when actuated by threading the screw into the pin provides outward, arcing force at a non-perpendicular angle to the longitudinal axis of the pin.

Figure 8A:
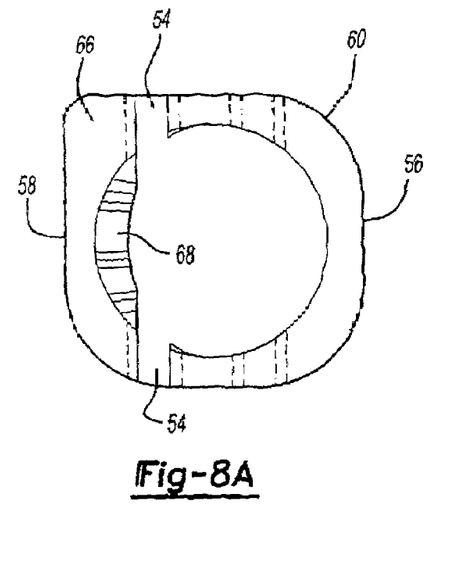
FIG. 8a is a top view of a sleeve according to a second embodiment of the invention.
Figure 8B:
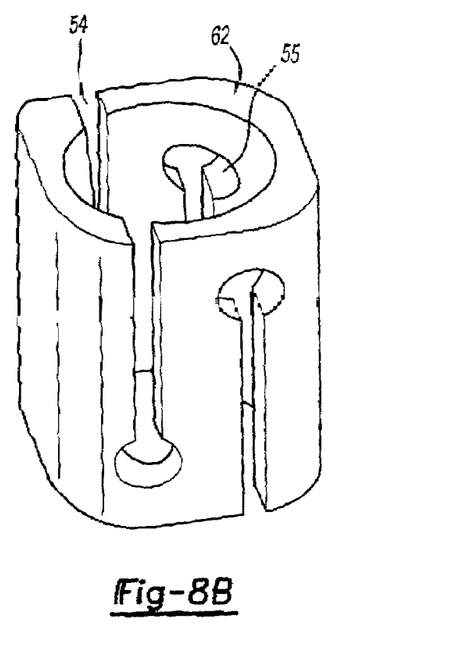

FIG. 8*a* and 8*b* show a sleeve 50 of according to a second embodiment of the invention wherein the slots 54 have widenings 55 to distribute the expansion force and prevent failure of the sleeve at the blind ends of the slots. In the embodiments of FIGS. 4 and 8, the slots are disposed on portions of the sleeve which are perpendicular to the flank of the insert engaged by the sleeve.

Figures 9A, 9B:
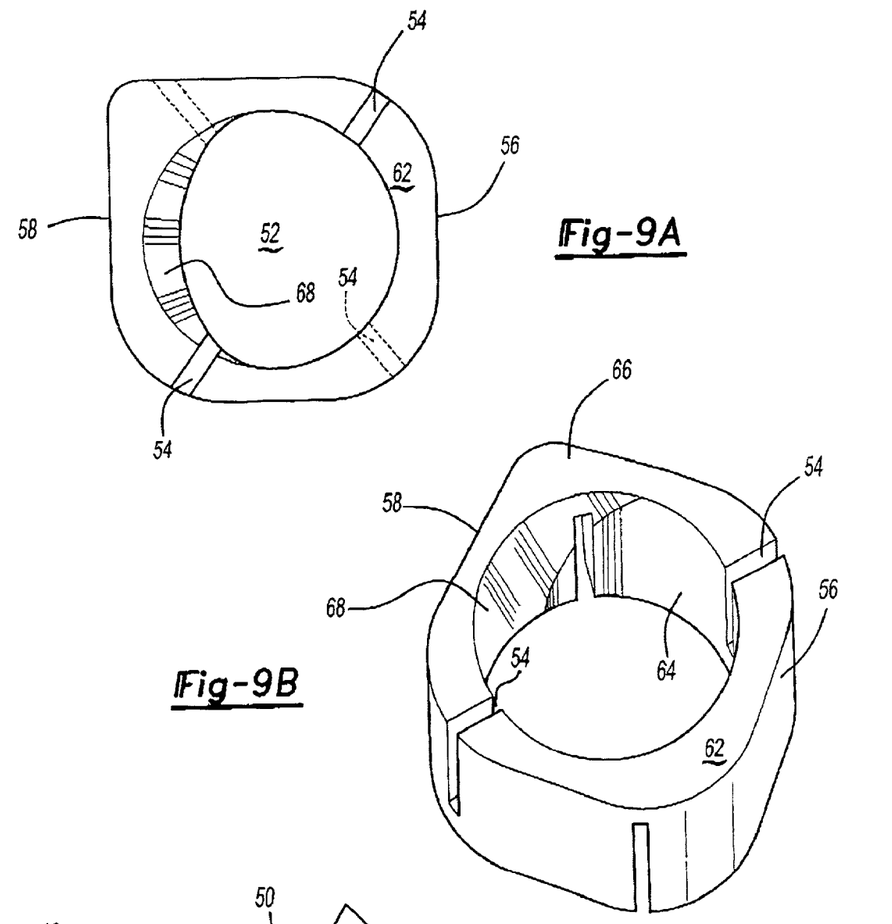

FIG. 9*a* and 9*b* show a sleeve according to a third embodiment of the invention having slots disposed near the corners of a polygonal sleeve 50.

Figure 10:
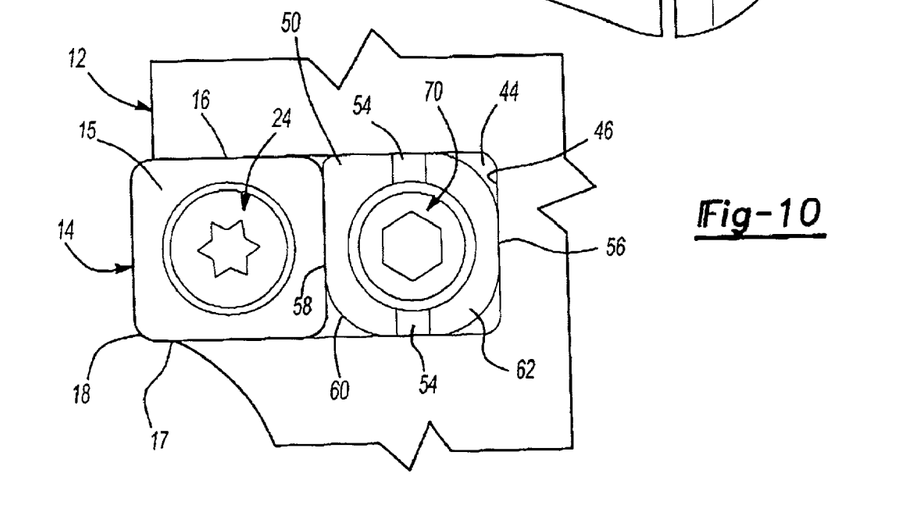
FIG. 10 is a top cutaway view of the another embodiment of the invention.

FIG. 10 is a top cutaway view of the another embodiment of the invention in the use environment of a rotary cutting tool utilizing inserts positioned in the tool body 12 in what is known in the industry as "laydown" cutting position. The retaining device of this embodiment comprises a holddown screw 24, which passes through the center of insert major face 15 and into the tool body in a manner known in the art. Insert 14 is adjustably secured to the tool body by retaining device 24. Sleeve 50 is positioned in the cavity 44 of tool body 12 by adjusting screw 70 such that abutment flank 56 contacts abutment surface 46 of the cavity 44 and flexing flank 58 engages insert 14. No clearance space is required as flexing surface 58 of sleeve 50 does not adjoin a clearance surface 47 of cavity 44, but instead extends only along the insert.

It is intended that the specification and examples be considered as exemplary only. Other embodiments of the invention, within the scope and spirit of the following claims will be apparent to those of skill in the art from practice of the invention disclosed herein and consideration of this specification. All documents referred to herein are incorporated by reference hereby.

What is claimed is:

1. A device for adjusting the position of a cutting insert adjustably secured in a pocket disposed in a holder, comprising:
   a cavity in said holder, at least a portion of said cavity being contiguous with said pocket;
   an intermediate component separate from said holder and disposed within said cavity, said intermediate component comprising an external peripheral surface and at least one expansion mechanism, said external peripheral surface engaging the insert at said contiguous portion; and
   a wedging device movably attached directly to said holder and engaging the intermediate component such that actuation of the wedging device results in expansion of the intermediate component in a direction substantially parallel to a desired direction of adjustment of the insert.

2. The device of claim 1, wherein said expansion mechanism comprises slots and a tapered portion disposed on a first region of an internal peripheral surface of said intermediate component.

3. The device of claim 1 wherein said wedging device comprises a conical wedge.

4. The device of claim 3 wherein said wedging device includes an adjustment screw threadingly engaged to the holder.

5. The device of claim 1 wherein said intermediate component defines a portion of a pocket side of said pocket.

6. The device of claim 1 wherein the intermediate component further comprises opposite end faces facing generally parallel to a direction of movement of said wedging device, each end face being intersected by at least one expansion element.

7. The device of claim 1 wherein actuation of the wedging device causes expansion of the intermediate component along substantially the entire length of said component.

8. A method for adjusting the position of an insert relative to a holder, wherein said holder has a pocket having a floor and sides and a retaining device for adjustably securing the insert to said holder, comprising the steps of:
   A) positioning an insert in said pocket in engagement with a sleeve; the sleeve including an end, an external peripheral surface and at least one expansion mechanism; a hole extending through the end of the sleeve; the at least one expansion mechanism comprising generally aligned slot portions formed in the end and separated from one another by said hole; said external peripheral surface including a first portion engaging the insert, and a second portion engaging a wall of said cavity disposed opposite said pocket, said slot portions disposed between said first and second portions of said external surface; said hole having a tapered portion disposed adjacent said first portion of said external surface, and an opposing cylindrical portion disposed adjacent said second portion of said external surface;
   B) tightening the retaining device to secure the insert in the pocket; and
   C) tightening a wedging device disposed in said hole while said second portion of said peripheral surface engages said wall, causing a conical wedging surface of said wedging device to contact both said tapered portion and said cylindrical portion, whereupon said wedging device exerts a wedging action against the tapered portion of the hole surface, thereby causing expansion of the first portion of the external surface, resulting in change of position of the insert.

9. The device of claim 1 wherein said intermediate component comprises a sleeve having a through-hole extending therethrough, and through which said wedging element extends.

10. The device of claim 9 wherein said through-hole is defined by a surface, a first portion of said surface located closest to said insert being tapered correspondingly to a taper of said wedging element, a second portion of said surface located diametrically opposite said first portion being substantially cylindrical.

11. The device of claim 10 wherein said sleeve includes opposite ends through which said hole extends, said opposite ends including respective first and second pairs of oppositely facing slots, defining said expansion mechanism, said slots of each of said first and second pairs being separated from one another by said hole, said first pair of slots offset from said second pair of slots as said sleeve is viewed along said center axis.

12. The device of claim 11 wherein said sleeve includes a plurality of sides together forming a polygonal shape, a first of said sides being disposed adjacent said first portion of said hole surface, and a second of said sides being disposed opposite said first side and abutting against a wall of said pocket.

13. The device of claim 9 wherein said sleeve includes a plurality of sides together forming a polygonal shape, a first of said sides being disposed adjacent said first portion of said hole surface, and a second of said sides being disposed opposite said first side and abutting against a wall of said pocket.

14. The device of claim 1 wherein said holder comprises a rotatable tool body defining an axis of rotation.

15. A device for adjusting the position of a cutting insert disposed within a pocket of a holder comprising:
   a retaining device in said holder for adjustably securing said insert;
   a sleeve disposed in a cavity in said holder, said cavity being at least partially contiguous with said pocket, said sleeve including opposite first and second ends and an external surface extending between said first and second sleeve ends, a through-hole extending through said sleeve from said first sleeve end to said second sleeve end, a surface of said through-hole defining an internal surface of said sleeve, a portion of said external surface defining a flexing flank surface for engaging a flank of said insert, said flexing flank surface having a length parallel to a center axis of said through-hole, a portion of said internal surface being situated adjacent said external flexing flank and being tapered with respect to said center axis, said first sleeve end including a first pair of oppositely disposed slots formed therein and separated from one another by said through-hole, said second sleeve end including a second pair of oppositely disposed slots formed therein and separated from one another by said through-hole, each of said slots extending from said external surface to said internal surface, said first pair of slots being offset from said second pair of slots in a direction perpendicular to said center axis; and an adjustment screw extending-through said through-hole and being threadingly connected in said holder, said screw including a wedge-shaped portion disposed in said through-hole and engaging said tapered surface portion of said internal surface adjacent said first and second sleeve ends, such that rotation of said screw in one direction causes said sleeve to expand at both of said first and second pairs of slots in a direction toward said insert, wherein said flexing flank surface is translationally displaced along its entire length toward said insert for displacing said insert.

16. The device according to claim 15 wherein a portion of said external surface disposed opposite said portion thereof which engages said insert is arranged to bear against a wall of said pocket prior to a termination of said expansion of said sleeve.

17. The device according to claim 16 wherein a portion of said internal surface situated opposite said tapered portion thereof is substantially cylindrical.

18. The device according to claim 15 wherein said holder comprises a tool body defining an axis of rotation.

19. The device according to claim 15 wherein said holder comprises a cartridge mounted in a tool body which defines an axis of rotation.

20. A device for adjusting the position of a cutting insert disposed within a pocket of a holder comprising:

a retaining device in said holder for adjustably securing said insert;

a cavity formed in said holder and being at least partially contiguous with said pocket, said cavity including a wall situated opposite said pocket;

a sleeve disposed in said cavity and including opposite first and second ends and an external surface extending between said first and second sleeve ends, a hole disposed in said sleeve wherein a surface of said hole defines an internal surface of said sleeve, a first portion of said external surface defining a flexing flank surface for engaging said insert, a second portion of said external surface being situated diametrically opposite said first portion and facing said wall of said cavity, a first portion of said internal surface being situated adjacent said external flexing surface and being tapered with respect to a center axis of said hole, a second portion of said internal surface being situated diametrically opposite said first portion and being cylindrically shaped, at least one of said sleeve ends including a pair of oppositely disposed slots separated from one another by said hole, each slot extending from said external surface to said internal surface and positioned between said first and second portions of said internal surface; and an adjustment screw including a wedge-shaped portion disposed in said hole and engaging said first portion of said internal surface, said screw being rotatable in a direction causing said sleeve to expand at said slots, wherein said second portion of said external surface bears against said wall of said cavity, and said first portion of said external surface is displaced toward said insert to adjustably displace said insert while said second portion of said external surface bears against said wall to stabilize the sleeve.

\* \* \* \* \*